United States Patent [19]

Zimmer

[11] Patent Number: 5,566,494
[45] Date of Patent: Oct. 22, 1996

[54] LUMINESCENT FISHING LURE

[76] Inventor: Stephen A. Zimmer, 43 Terrace Garden, Wallingford, Conn. 06492

[21] Appl. No.: 469,846

[22] Filed: Jun. 6, 1995

[51] Int. Cl.$^6$ .................................................. A01K 85/00
[52] U.S. Cl. ............................................ 43/17.6; 43/42.31
[58] Field of Search .................................... 43/17.5, 17.6, 43/42.31

[56] References Cited

U.S. PATENT DOCUMENTS

| | | | |
|---|---|---|---|
| 4,610,103 | 9/1986 | Steinman | 43/17.6 |
| 4,638,584 | 1/1987 | Lindsay | 43/17.6 |
| 4,693,032 | 9/1987 | Mattison | 43/17.6 |
| 4,709,499 | 12/1987 | Ottaviano | 43/17.6 |
| 4,823,497 | 4/1989 | Pierce | 43/17.6 |

*Primary Examiner*—Kurt Rowan
*Assistant Examiner*—Darren Ark
*Attorney, Agent, or Firm*—McCormick, Paulding & Huber

[57] ABSTRACT

An illuminated top water lure has a lure body including a generally cylindrical forward part and a generally conical rear part. The lower portion of the lure is substantially heavier than the hollow upper portion and has a depending rib which extends along the cylindrical front portion of the lure body. The forward end of the body is defined by a radially disposed lower part and an upper part which is inclined upwardly and forwardly from the lower part. A chemiluminscent light stick contained within a forwardly open bore in the lower portion of the lure body is retained therein by a radially expandable elastomeric well nut. A metal ball contained within a chamber defined by the upper portion is adapted to impinge upon the walls of the chamber to produce sound waves as the lure moves through the water.

16 Claims, 1 Drawing Sheet

U.S. Patent    Oct. 22, 1996    5,566,494

LUMINESCENT FISHING LURE

BACKGROUND OF THE INVENTION

This invention relates in general to fishing lures and deals more particularly with an improved luminescent top water plug.

The general aim of the present invention is to provide an improved environmentally safe illuminated plug employing a replaceable chemiluminscent light source and which is particularly adapted for salt water casting to attract blue fish, striped bass, tuna and other fish which feed at or near the water surface.

SUMMARY OF THE INVENTION

In accordance with the present invention, an illuminated top water lure is provided which has a translucent, axially elongated lure body which includes a generally cylindrical main part and a generally conical part which converges rearwardly from the main part. The main part has a front wall which includes a generally radially disposed lower part and an upper part forwardly and upwardly inclined from the lower part. The upper portion of the cylindrical main part is substantially hollow whereas the lower portion of the main part is substantially solid and defines a blind bore which opens through the lower part of the front wall. A chemiluminscent light stick is freely received within the bore and retained therein by closure means which is received within the forward end of the bore and cooperates with the lower portion of the main part for sealing the bore and releasably retaining the chemiluminscent light stick therein. The lure further includes a hook, attaching means for securing the hook to the lure body, and connecting means for attaching a line to the forward part of the lure.

DETAILED DESCRIPTION OF PREFERRED EMBODIMENT

Figure 1:
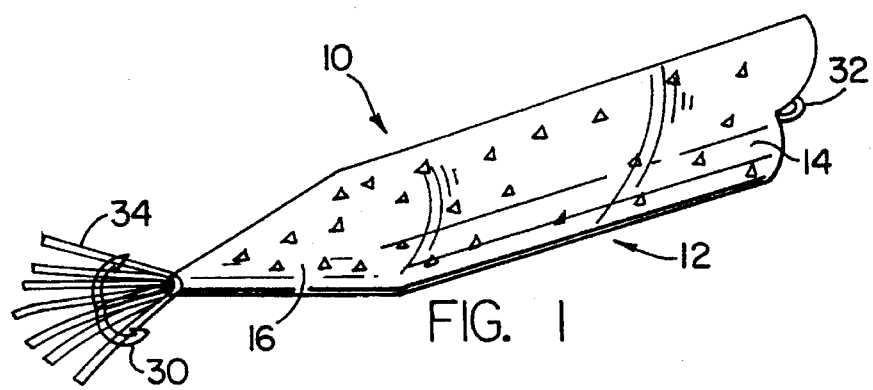
FIG. 1 is a perspective view of a luminescent fishing lure embodying the present invention.

Referring to FIG. 1–5 a top water lure or plug embodying the present invention is illustrated and indicated generally by the reference numeral 10. The illustrated plug 10, as oriented in the drawing, has an axially elongated body indicated generally at 12 which includes a generally cylindrical main part 14 and a generally conical rear part indicated at 16 which converges rearwardly from the main part 14. A front wall defined by the main part 14 includes a generally radially disposed lower portion 18 and an upper portion 20 which is forwardly and upwardly inclined from the lower portion 18 and preferably forming an angle of approximately 45 degrees with the longitudinal axis of the plug body. The plug body 12 may be made from any suitable translucent material, but preferably it is molded from a transparent plastic material containing flakes or particles of "glitter" or other suitable light reflecting material which is relatively evenly dispersed throughout the otherwise transparent plug body, substantially as shown in FIG. 1.

The plug body 12 is preferably formed by a pair of substantially identical half sections integrally joined along a parting line disposed within a vertical plane (now shown). The upper portion of at least the main part 14 is hollow and comprises a substantially thin walled shell which defines a chamber 21 whereas the lower portion of the lure body 12 is substantially solid and defines a generally cylindrical blind bore 22 which extends in a generally axial direction and opens through the front wall lower portion 18, substantially as shown. A rib 24 integrally formed on the plug body projects downwardly from the lowermost portion of the body and extends along the entire length of the main part 14.

Figure 4:
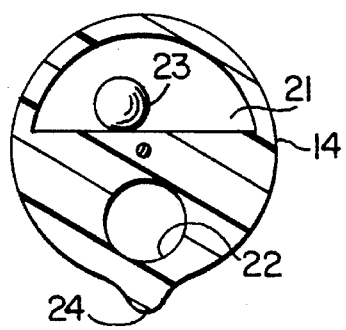
FIG. 4 is a somewhat enlarged sectional view taken along the line 4—4 of FIG. 3 and shows the lure with the light stick removed from it.
Figure 3:
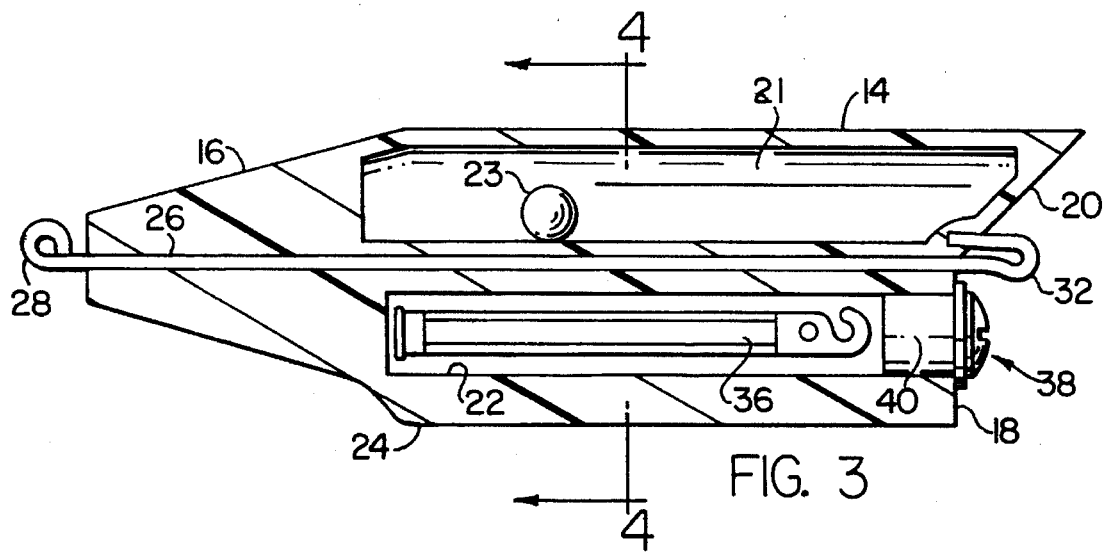
FIG. 3 is a sectional view through the lure body and taken generally along the line 3—3 of FIG. 2.

The chamber 21 contains a freely moveable element or metal ball 23, shown in FIGS. 3 and 4. The ball 23 is adapted to impinge upon the walls of the chamber 21 to produce sound waves as the lure 10 moves through the water.

A metal rod 26 extends coaxially through the plug body 12 and has a first eye 28 formed at its rear end and exposed externally of the body for securing a hook 30 to the rear of the plug. A second eye indicated at 32 is formed at the forward end of the rod 26 and exposed externally of the lure body 12 for attaching a line to the forward part of the plug 10.

A skirt 34 formed by a multiplicity of flexible filaments which project from the rear portion of the plug body 12 provides concealment for the hook 30. The flexible filaments which comprise the skirt 34 move as the lure travels through the water to attract fish toward a striking point in the region of the hook 30.

The lure 10 is illuminated by a chemiluminscent light stick 36 of a type well known in the art. The presently preferred light stick is environmentally safe, non-toxic and non-flammable and is marketed in a variety of fluorescent colors by American Cyanamide Company, Wayne, N.J. 07470, under the trademark LITE-UP light stick. The bore 22 is sized to freely receive the light stick 36 therein so that the light stick may be easily inserted into and removed from the bore for replacement, as required. An expandable well nut, indicated generally at 38, received within the forward end portion of the bore 22 cooperates with the lower portion 18 to seal the bore and releasably retain a chemiluminscent light stick 36 therein.

Figure 5:
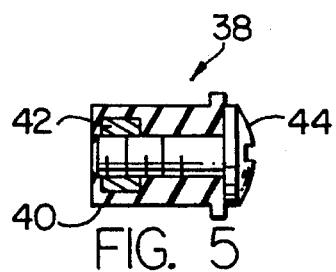
FIG. 5 is a somewhat enlarged axial sectional view
Figure 2:
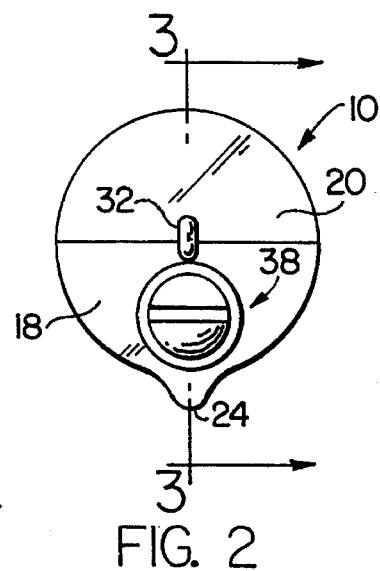
FIG. 2 is a somewhat enlarged front elevational view of the lure shown in FIG. 1.

The expandable well nut, best shown in FIG. 5 has a generally cylindrical nut body 40 made from an elastomeric material such as rubber and containing a rigid nut 42 secured in a fixed position within the nut body where a threaded fastener 44 is engaged with the nut 42. Rotation of the fastener 44 in one direction relative to the nut body 40 causes axial compression and radial expansion of the elastomeric nut body 40 within the bore 22, thereby effectively sealing the forward end of the bore.

Preparatory to using the plug 10, a light stick 36 is activated by axially bending a central portion of the light stick until it snaps, thereby fracturing a frangible capsule contained within the light stick to release a compound which mixes with another liquid chemical compound contained within the translucent light stick to produce luminescence. The activated light stick is then inserted into the bore 22 and sealed and releasably retained therein by the expandable well nut 38.

The forwardly and upwardly inclined front wall upper portion 20, the weight distribution of the lure which is concentrated in the lower portion of the plug body 12 and the rib 24 cooperate to cause the top water lure 10 to maintain a proper tracking orientation as it is hauled through the water. As previously discussed, the ball 23 is adapted to impinge upon the walls of the chamber 21 to produce sound waves for attracting fish as the lure 10 moves through the water.

As previously noted, chemiluminscent light sticks are available in a plurality of differing colors. A red light stick used with the plug 10 simulates a bleeding bait fish, whereas a blue light stick simulates most of the bait fish in the ocean. A green light stick may be employed to simulate most of the night species. However, it should be understood that each of the aforesaid colors can be used in either day or night fishing.

I claim:

1. An illuminated top water lure comprising a translucent axially elongated lure body having a generally cylindrical main part and a generally conical rear part, said main part defining a front wall having a generally radially disposed lower portion and an upper portion forwardly and upwardly inclined from said lower portion, said main part having a generally solid lower portion and a substantially hollow upper portion, said lower portion having a blind bore therein opening through said front wall lower portion, a chemiluminscent light stick freely received within said bore, closure means received within a forward end of said bore and cooperating with said lure body for sealing said bore and releasably retaining said chemiluminscent light stick therein, a barbed hook, hook attaching means for securing said hook to said lure body, and connecting means for attaching a line to said lure.

2. An illuminated top water lure as set forth in claim 1 including a rib integrally connected to and projecting downwardly from the lowermost portion of said main part and extending therealong.

3. An illuminated top water lure as set forth in claim 1 wherein said closure means comprises a radially expendable well nut.

4. An illuminated top water lure as set forth in claim 3 wherein said well nut includes an elastomeric body containing an insert and a fastener threadably engaged with said insert and exposed externally of said lure body for axially compressing and radially expanding said elastomeric body within said bore.

5. An illuminated top water lure as set forth in claim 1 including a rod extending coaxially through said lure body and wherein said attaching means comprises a first eye at the forward end of said rod.

6. An illuminated top water lure as set forth in claim 5 wherein said connecting means comprises a second eye at the rear end of said rod.

7. An illuminated top water lure as set forth in claim 1 including a skirt wherein said translucent lure body contains particles of light reflecting material.

8. An illuminated top water lure as set forth in claim 1 attached to the rear of said lure body and comprising a multiplicity of rearwardly extending flexible filaments generally concealing said hook.

9. An illuminated top water lure as set forth in claim 1 wherein said hollow upper portion defines a chamber and said lure includes means within said chamber for producing sound waves as said lure is moved through the water.

10. An illuminated top water lure as set forth in claim 9 wherein said means for producing sound waves comprises an element freely moveable within said chamber.

11. An illuminated top water lure as set forth in claim 10 wherein said element comprises a metal ball.

12. An illuminated top water lure comprising a transparent axially elongated lure body having a cylindrical main part and a generally conical rear part rearwardly converging from said main part, said main part defining a front wall having a generally radially disposed lower portion and an upper portion forwardly and upwardly inclined from said lower portion, said main part having a substantially solid lower portion and a substantially hollow upper portion, said lower portion having a blind bore therein opening through said front wall lower part, a chemiluminscent light stick freely received within said bore, closure means received within the forward end of said bore and cooperating with said lure body for sealing said bore and releasably retaining said chemiluminscent light stick therein and including a well nut received within the forward end of said bore and having an elastomeric body, an insert contained within said elastomeric body, and a fastener threadably engaged with said insert for axially compressing and radially expanding said elastomeric body within said bore to sealingly engage an associated portion of the wall of said bore, a rod extending coaxially through said lure body and having a first eye at its forward end exposed externally of the lure body and a second eye at its forward end exposed externally of the lure body, a barbed hook secured to said lure body by said first eye, and a skirt formed by a multiplicity of elongated flexible filaments connected to the rear end of said lure body and providing concealment for said barbed hook.

13. An illuminated top water lure as set forth in claim 9 wherein said lure includes particles of light reflecting material interdispersed throughout said translucent lure body.

14. An illuminated top water lure as set forth in claim 12 wherein said hollow upper portion defines a chamber and said lure includes means within said chamber for producing sound waves as said lure is moved through the water.

15. An illuminated top water lure as set forth in claim 14 wherein said means for producing sound waves comprises an element freely moveable within said chamber.

16. An illuminated top water lure as set forth in claim 15 wherein said element comprises a metal ball.

\* \* \* \* \*